(12) United States Patent
Ishimaru

(10) Patent No.: US 7,518,653 B2
(45) Date of Patent: Apr. 14, 2009

(54) DIGITAL CAMERA HAVING A PLURALITY OF OPERATION MODES OF DIFFERENT POWER CONSUMPTION

(75) Inventor: Yoshiaki Ishimaru, Asaka (JP)

(73) Assignee: FUJIFILM Corporation (JP)

(*) Notice: Subject to any disclaimer, the term of this patent is extended or adjusted under 35 U.S.C. 154(b) by 775 days.

(21) Appl. No.: 10/264,346

(22) Filed: Oct. 4, 2002

(65) Prior Publication Data

US 2003/0076438 A1    Apr. 24, 2003

(30) Foreign Application Priority Data

Oct. 5, 2001    (JP)    ............... 2001-309456

(51) Int. Cl.
*H04N 5/225* (2006.01)

(52) U.S. Cl. .................................... 348/372

(58) Field of Classification Search ................ 348/372; 396/301, 302, 303, 304, 429, 277, 278, 279
See application file for complete search history.

(56) References Cited

U.S. PATENT DOCUMENTS

| | | | |
|---|---|---|---|
| 5,014,136 A * | 5/1991 | Sakai et al. ................. | 386/101 |
| 6,009,393 A * | 12/1999 | Sasaki ........................ | 704/258 |
| 6,023,539 A * | 2/2000 | Ohnami et al. .............. | 382/317 |
| 6,094,282 A * | 7/2000 | Hoda et al. ................. | 358/401 |
| 6,850,270 B1 * | 2/2005 | Suzuki ....................... | 348/207.2 |

FOREIGN PATENT DOCUMENTS

| | | | |
|---|---|---|---|
| JP | 6-22262 A | | 1/1994 |
| JP | 8-149178 | | 6/1996 |
| JP | 9-81524 | | 3/1997 |
| JP | 9-130649 A | | 5/1997 |
| JP | 09130649 A | * | 5/1997 |
| JP | 10-337001 A | | 12/1998 |
| JP | 2001-57685 A | | 2/2001 |

* cited by examiner

*Primary Examiner*—Justin P Misleh
(74) *Attorney, Agent, or Firm*—Sughrue Mion, PLLC

(57) ABSTRACT

Power consumption can be reduced, and an operating time can be extended in an operation mode having lower fluctuation in power consumption in equipment having a plurality of operation modes of different power consumption. In the digital camera which also functions as an audio recorder and an audio player, it is determined whether the operation mode of the digital camera is an audio recording mode or an audio reproducing mode, or it is any other mode (shooting mode, etc.). In the audio recording mode or the audio reproducing mode, an output voltage from a power supply circuit is reduced to be lower than in the shooting mode, etc., and the threshold as a battery operation termination voltage in a battery checking process is lowered. Thus, the power consumption is reduced when the digital camera is operated as the audio recorder or the audio player, and operating time can be extended.

8 Claims, 4 Drawing Sheets

DIGITAL CAMERA HAVING A PLURALITY OF OPERATION MODES OF DIFFERENT POWER CONSUMPTION

BACKGROUND OF THE INVENTION

1. Field of the Invention

The present invention relates to an information recording/reproducing apparatus, and more specifically to an information recording/reproducing apparatus having a plurality of operation modes of different power consumption, and having a battery as a power supply.

2. Description of the Related Art

Japanese Patent Application Publication No. 9-81524 discloses mobile electronic equipment designed to reduce the power consumption of the mobile electronic equipment such that a voltage of a battery can be boosted through a booster circuit only when the voltage of the battery becomes lower than the minimum voltage required to guarantee the operation of the equipment. That is, the power consumption in the booster circuit can be reduced by operating the booster circuit only when the voltage of the battery drops.

Japanese Patent Application Publication No. 8-149178 discloses an electric current control method of reducing the power consumption in the entire apparatus by restricting the passage of the electric current from the power supply corresponding to functional blocks except necessary functional blocks depending on the use state of the apparatus.

Recently, a digital camera has been developed to have an audio recording function of recording audio in semiconductor memory, and an audio reproducing function of reproducing music data generated as a file which can be recorded in the semiconductor memory represented by MP3 equipment.

This type of digital camera indicates different power consumption between an image recording/reproducing mode in which it functions as an original digital camera, and an audio recording/reproducing mode in which the above-mentioned audio recording and reproducing functions are used.

That is, the above-mentioned digital camera is loaded with an image processing large scale integrated circuit (LSI) for recording/reproducing an image and an audio processing LSI for recording/reproducing audio. The image processing LSI consumes a large amount of power because it operates at a high speed. On the other hand, the audio processing LSI requires a process performed at lower speed than the image processing LSI, thereby operating with low power consumption. Normally, a low-speed LSI can be operated at a lower voltage than a high-speed LSI.

It is desired that power is supplied from different power sources to the above-mentioned image processing LSI and audio processing LSI. However, the same power source actually supplies power to the both image processing LSI and audio processing LSI because of the size restriction of equipment, and the power supply voltage adapted to the high-speed image processing LSI is also supplied to the low-speed audio processing LSI. Therefore, although a digital camera is used in the audio recording/reproducing mode (that is, although the image processing LSI is not used), a voltage higher than a necessary voltage for the operation of the audio processing LSI is supplied to the audio processing LSI. As a result, the entire power consumption unnecessarily increases.

Furthermore, with respect to a digital camera, it is necessary to operate the image processing LSI, an electric flash device, a lens drive unit, a liquid crystal monitor, etc. in the shooting mode. Therefore, since the digital camera's circuit is designed with large power consumption and the fluctuation in power consumption by the charge of the electric flash device, the drive of the lens, etc. taken into account, the operation-terminating voltage of the battery to be checked is set high. Accordingly, although the digital camera is used in the operation mode in which the power consumption is low and it is not likely to incur large fluctuation in power consumption (that is, in the audio recording/reproducing mode), the above-mentioned battery check disables the operation in the state of a high voltage of the battery. Since the audio recording/reproducing functions are intended to record the proceedings of a meeting, play back music in the field, etc., a long-time operation is required. However, since the set operation-terminating voltage of the battery is high, the system is disabled before fully exhausting the battery.

SUMMARY OF THE INVENTION

The present invention has been achieved to solve the above-mentioned problems, and aims at reducing power consumption in an information recording/reproducing apparatus having a plurality of operation modes of different power consumption, and operating for a longer time in an operation mode requiring small power consumption and small fluctuation in power consumption.

To attain the above-mentioned object, the present invention is directed to an information recording/reproducing apparatus having a plurality of operation modes of different power consumption, the apparatus comprising: a mode selection device which selects a desired operation mode from the plurality of operation modes; a power supply device which supplies power of a required voltage to a circuit unit in the apparatus; and a voltage control device which changes an operating voltage to be supplied to the circuit unit from the power supply device depending on the operation mode selected by the mode selection device.

For example, when an operation mode requiring only a low-speed process which can be operated at a low voltage is selected, the operating voltage to be supplied to the circuit unit is lowered. When the operating voltage is lowered, current consumption is reduced. Therefore, the power consumption which is a product of the voltage and the current can be considerably reduced. Furthermore, with the power supply device having a booster circuit, the entire power consumption can be reduced by lowering the output voltage even if the same output current is used.

The present invention is also directed to an information recording/reproducing apparatus having a plurality of operation modes of different power consumption, the apparatus comprising: a mode selection device which selects a desired operation mode from the plurality of operation modes; a battery which supplies power for driving the apparatus; a battery check device which terminates a battery operation when an output voltage of the battery drops down to a predetermined threshold; and a threshold control device which changes the threshold in the battery check device depending on the operation mode selected by the mode selection device.

That is, the threshold in the battery check device is changed depending on the selected operation mode, thereby changing a battery operation termination voltage.

The present invention is also directed to an information recording/reproducing apparatus having a plurality of operation modes of different power consumption, the apparatus comprising: a mode selection device which selects a desired operation mode from the plurality of operation modes; a power supply device which supplies power of a required voltage to a circuit unit in the apparatus; a battery which supplies power to the power supply device; a battery check device which terminates a battery operation when an output voltage of the battery drops down to a predetermined threshold; a voltage control device which changes an operating voltage to be supplied to the circuit unit from the power supply device depending on the operation mode selected by the mode selection device; and a threshold control device which changes the threshold in the battery check device depending on the operation mode selected by the mode selection device.

In an aspect of the present invention, the voltage control device lowers the operating voltage to be supplied to the circuit unit from the power supply device when the mode selection device selects one of the plurality of the operation modes, the one of the plurality of operation modes having lower power consumption and a smaller fluctuation in power consumption than other of the plurality of the operation modes.

In an aspect of the present invention, the threshold control device lowers the threshold in the battery check device when the mode selection device selects one of the plurality of the operation modes, the one of the plurality of operation modes having lower power consumption and a smaller fluctuation in power consumption than other of the plurality of the operation modes.

In an aspect of the present invention, the circuit unit in the apparatus comprises a first circuit unit whose operation is guaranteed by a first voltage, and a second circuit unit whose operation is guaranteed by a second voltage lower than the first voltage, the second circuit unit always operating in the plurality of operation modes; and the voltage control device allows the first voltage to be supplied from the power supply device to the first circuit unit and the second circuit unit when the first circuit unit and the second circuit unit are operated by the operation mode selected by the mode selection device, and allows the second voltage to be supplied from the power supply device to the second circuit unit when only the second circuit unit is operated. That is, in the operation mode in which the first and second circuit units are operated, a higher voltage (the first voltage) between the first and second voltages which guarantee the operations of the first and second circuit units is supplied, and in the operation mode in which only the second circuit unit is operated, a lower voltage (the second voltage) is supplied.

In an aspect of the present invention, the plurality of operation modes include a shooting mode for recording an image, an image reproducing mode for reproducing an image, an audio recording mode for recording audio, and an audio reproducing mode for reproducing audio; and the voltage control device lowers the operating voltage to be supplied to a circuit unit operating in at least one of the audio recording mode and the audio reproducing mode when the mode selection device selects one of the audio recording mode and the audio reproducing mode.

In an aspect of the present invention, the plurality of operation modes include a shooting mode for recording an image, an image reproducing mode for reproducing an image, an audio recording mode for recording audio, and an audio reproducing mode for reproducing audio; and the threshold control device lowers the threshold in the battery check device when the mode selection device selects one of the audio recording mode and the audio reproducing mode.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The preferred embodiments of the information recording/reproducing apparatus according to the present invention will be described below by referring to the attached drawings.

Figure 1:
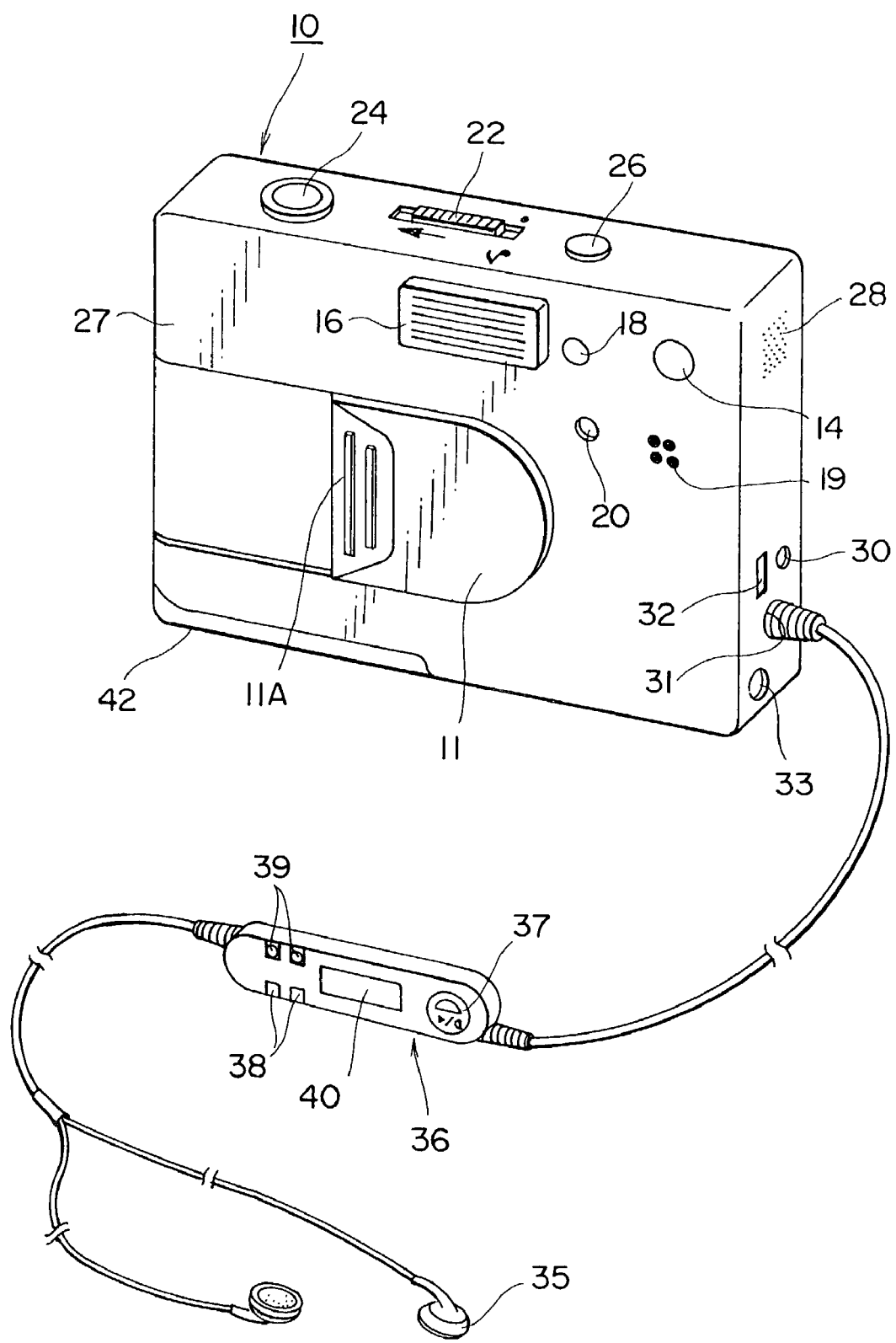
FIG. 1 shows an outside drawing of an information recording/reproducing apparatus (digital camera) according to the present invention.
Figure 2:
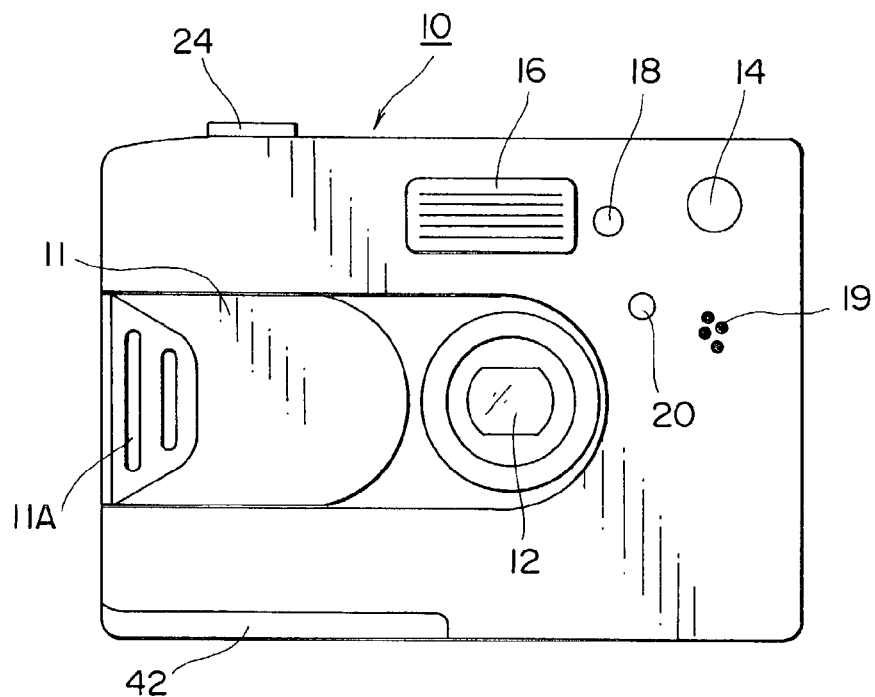
FIG. 2 is a front view of the digital camera shown in FIG. 1.
Figure 3:
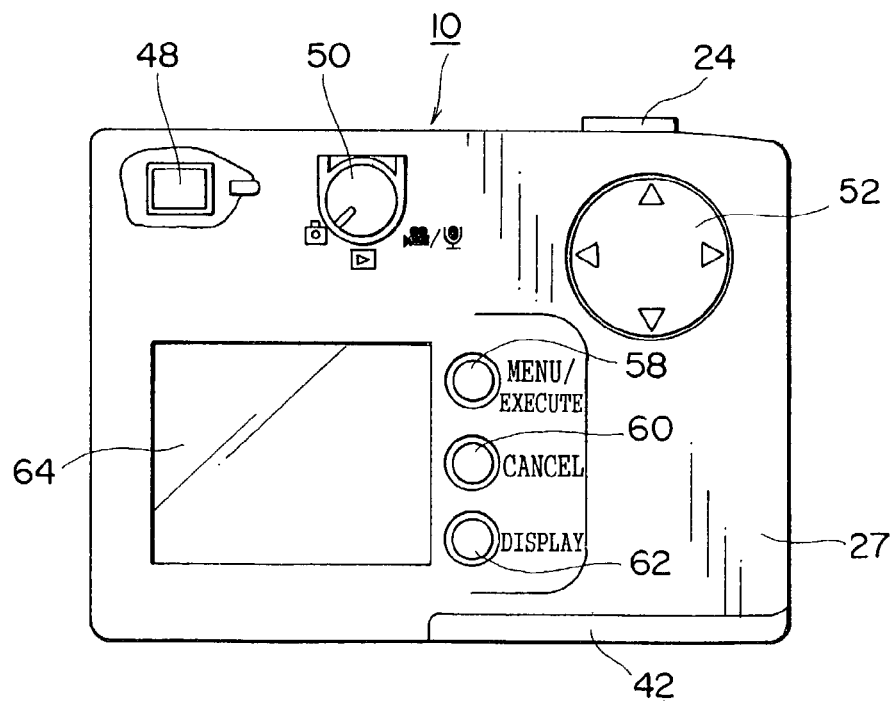
FIG. 3 is a back view of the digital camera shown in FIG. 1.

FIG. 1 is an outside drawing of an information recording/reproducing apparatus according to an embodiment of the present invention, and shows such a case that a digital camera is used as an information recording/reproducing apparatus. FIG. 2 is a front view of the digital camera shown in FIG. 1, and FIG. 3 is a back view of the digital camera.

As shown in these drawings, a lens barrier 11, a finder window 14, an electric flash emission unit 16, an electric flash dimmer sensor 18, a microphone 19, and a self-timer lamp 20 are provided on a front face of the digital camera 10.

As shown in FIG. 1, a power switch 22, a release button 24, and an electric flash button 26 for switching a shooting mode with an electric flash light are provided on a top face of the digital camera 10. On the side opposite to a grip portion 27 of the digital camera 10, a speaker 28, an audio/image output terminal (line-out terminal) 30, a remote control terminal 31 including an audio output terminal, a digital terminal (USB) 32, and a power input terminal 33 are provided.

The power switch 22 also functions as a mode setting switch. It is a slide switch which is locked when a knob shown in FIG. 1 is moved rightward (in an audio reproducing mode position), and is not locked when the knob is moved leftward. Each time the knob is moved leftward, a "camera mode" and an "OFF mode" for turning off a power supply in the digital camera 10 are alternately set.

A remote controller 36 with a head phone (ear phone) 35 can be connected to the remote control terminal 31. The remote controller 36 comprises a switch unit including a reproduction/stop button 37, a forward/rewind button 38, a volume adjustment button 39, etc. and an LCD panel 40. When the switch unit is operated, a command signal is transmitted to the digital camera 10 depending on the operation, and a process is performed corresponding to an indication.

The release button 24 is configured in two stages, and the automatic focus adjusting control (AF) and the automatic exposure control (AE) operate in the "half press (S1=ON)" state set by gently pressing and then stopping the release button 24, thereby locking the AF and AE, and the shooting operation is performed in the "full press (S2=ON)" state set by further pressing the button from the "half press" state. The release button 24 is a device for transmitting an indication to start recording a still image, and also functions as a moving picture recording button (image recording start/stop button) and a recording button in the audio recording mode (audio recording start/stop button).

A battery cover 42 which is also used as a slot cover of a memory card (not described in FIG. 1, but is described as reference numeral 72 in FIG. 4) is provided on a bottom face of the digital camera 10, and a card slot and a battery container casing (not shown) are formed back beyond the battery cover 42.

As shown in FIG. 2, the lens barrier 11 is slid leftward to set the barrier in an open state, then a collapsible taking lens 12 is exposed. The lens barrier 11 has a non-slipping grooved portion 11A.

As shown in FIG. 3, there are a finder 48, a mode dial 50, a cross button 52, a menu/execution key 58, a cancel/return key 60, a display key 62, a liquid crystal monitor 64, etc. on a back face of the digital camera 10. The mode dial 50 changes the functions (modes) of the digital camera 10. By rotating the mode dial 50, a shooting mode for taking a still image, a reproduction mode for reproducing the taken image, a movie mode for taking a moving picture with audio, or an audio recording mode for audio recording without any image can be set. The selection positions for the movie mode and the audio recording mode are common, and the movie mode or the audio recording mode can be automatically set depending on an open/close state of the lens barrier 11.

The cross buttons 52 are multifunction operating units which can receive indications from left, right, above, and below. A left key and a right key are respectively a frame backward button and a frame forward button at the time of reproducing mode. An up key and a down key are zoom keys for adjusting the scaling factor, respectively, in a reproducing zoom function and an electronic zoom function when a picture is taken.

The cross button 52 functions as an operation button by selecting a menu item on the menu screen displayed by pressing the menu/execution key 58, and selecting various setting items in each menu. The menu/execution key 58 is used when a normal screen in each mode is switched into a menu screen, selection contents are determined, the execution (confirmation) of a process is indicated, etc. The cancel/return key 60 is used when an item selected from a menu is canceled, control is returned to the operation state immediately before, etc. The display key 62 turns ON/OFF the liquid crystal monitor 64, switches the reproducing methods or display to/from non-display of a frame number, etc. being reproduced.

The liquid crystal monitor 64 can be used as an electronic finder for confirmation of an image, and can display a preview image of a taken image, a reproduced image, etc. read from the memory card 72 inserted into the digital camera 10. The display screen of the liquid crystal monitor 64 is used in selecting a menu using the cross button 52, and setting various setting items in each menu. Furthermore, the liquid crystal monitor 64 also displays the number of frames which can be taken (or the time in which moving pictures can be taken), the number or a reproduced frame number, the presence/absence of an electric flash light, a macro mode, the quality of a recorded image, information about the number of pixels.

Figure 4:
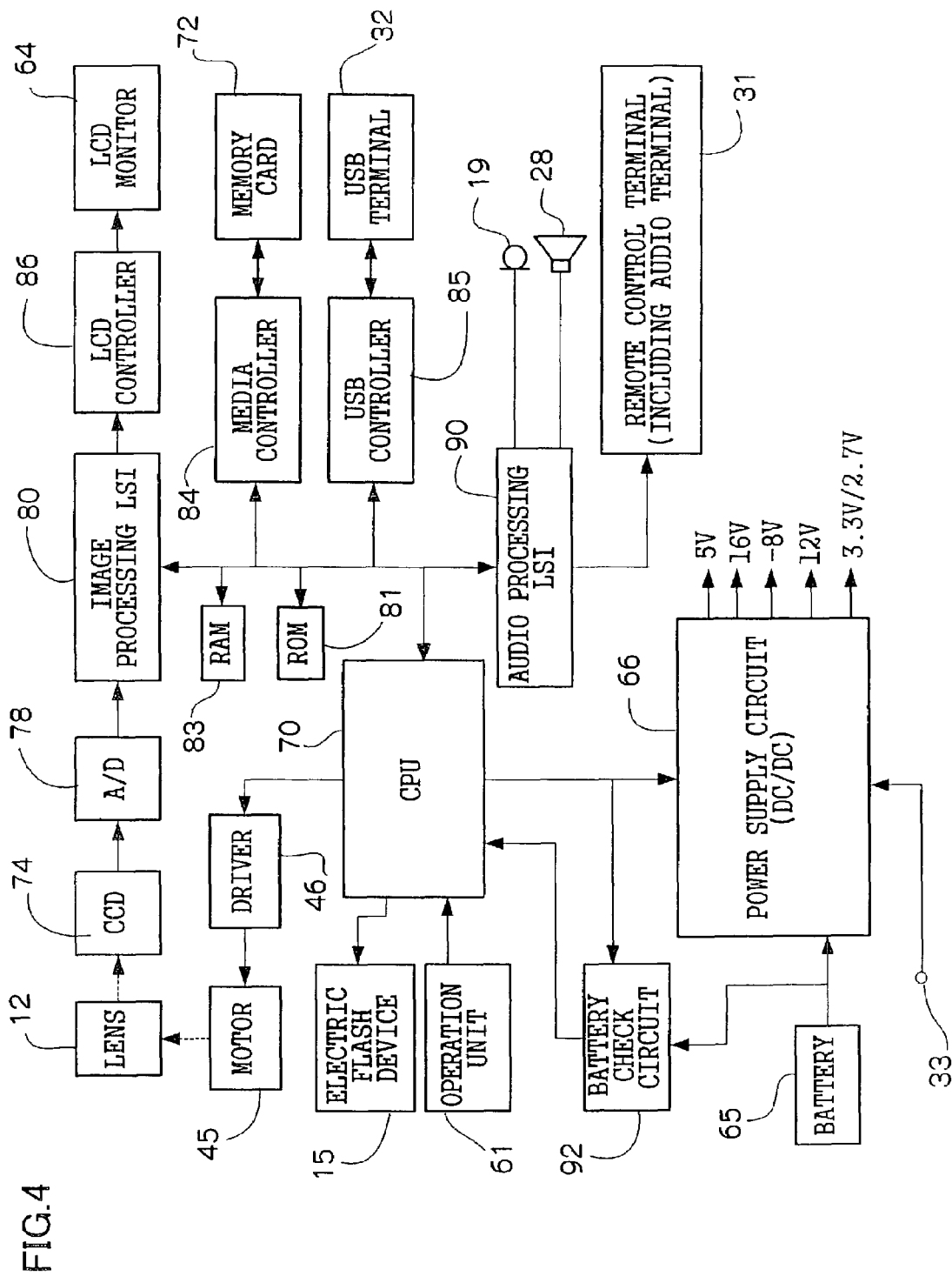
FIG. 4 is a block diagram of an internal configuration of the digital camera according to an embodiment of the present invention.

FIG. 4 is a block diagram of an internal configuration of the digital camera 10. In FIG. 4, a central processing unit (CPU) 70 is a control unit for integrally controlling a system of the digital camera 10. The CPU 70 controls an operation of each circuit in the digital camera 10 according to an input of a command signal from an operation unit 61. The operation unit 61 is a block including the input operation devices such as the above-mentioned cross button 52, the menu/execution key 58, the cancel/return key 60, the display key 62, etc.

A ROM 81 stores a program processed by the CPU 70 and various data, etc. required for control. A RAM 83 has an image process area and a work area used by the CPU 70 performing various arithmetic processes, etc. The power source of the digital camera 10 can be a battery 65 or an external power supply such as an AC power adapter, etc. connected to the power input terminal 33 but not shown in the attached drawings. The power supplied by the battery 65, etc. is converted into a desired voltage by a power supply circuit 66 including a DC/DC converter, thereby supplying the power to each circuit block. The power supply circuit 66 is described later in detail.

The taking lens 12 is composed of one or more lenses, and can be a unifocal lens or a zoom lens, etc. having a variable focal distance. The light passing through the taking lens 12 is adjusted in quantity of light by an iris (not shown), and is then received on a CCD image sensor (hereinafter referred to as a CCD) 74. A number of photosensors are flatly arranged on the light-receptive surface of the CCD 74, and the image of a subject formed on the light-receptive surface of the CCD 74 through the taking lens 12 is converted into the amount of a signal charge depending on the amount of the incident light by each photosensor.

The accumulated signal charge is sequentially read as a voltage signal depending on the signal charge. The voltage signals sequentially read from the CCD 74 are added to an A/D converter 78, and converted into R, G, and B digital signals, and then outputted to an image processing LSI 80.

The image processing LSI 80 performs predetermined image processes such as a synchronizing process of converting a point sequence of the R, G, and B signals added from the A/D converter 78 into a synchronization expression, a white balance adjustment, a gamma correction, a brightness/color difference signal process (YC process), a compressing/extending process, etc. Furthermore, the image processing LSI 80 contains VRAM for displaying an image, and the R, G, and B signals stored in the VRAM are outputted to the liquid crystal monitor 64 through an LCD controller 86. That is, the image data in the VRAM is periodically rewritten by an image signal outputted from the CCD 74, and the signal for displaying an image according to the image data is provided for the liquid crystal monitor 64, thereby displaying an image inputted through the CCD 74 on the liquid crystal monitor 64 in real time. The user of the digital camera 10 can confirm the taken image by the image displayed on the liquid crystal monitor 64 (live image) or the finder 48.

When a shooting mode is set by the mode dial 50 and the release button 24 is pressed (S2=ON), a shooting start command (release ON) signal is issued. Upon receipt of the command signal, the CPU 70 starts capturing image data for recording. Before the shooting operation, the CPU 70 controls automatic focus adjustment (AF) and automatic exposure control (AE) in response to the half press (S1=ON) on the release button 24. That is, the CPU 70 performs various arithmetic operations such as a focus evaluating operation, an AE operation, etc., controls a driver 46 of a lens drive motor 45 according to the operation results, and moves the taking lens 12 to the focal position. On the other hand, the iris drive unit (not shown) is controlled to appropriately set an iris value, and control the charge accumulating time of the CCD 74. The CPU 70 controls the electric flash emission by the electric flash device 15 as necessary.

The image data captured in response to the full press (S2=ON) on the release button 24 is stored in the RAM 83 by the image processing LSI 80 through the YC process and other predetermined signal processes, and the image data (a brightness signal Y and chroma signals Cr and Cb) captured to the RAM 83 is compressed in a predetermined format (for example, a JPEG system), and the compressed data is recorded on the memory card 72 through a media controller 84.

In the digital camera 10 according to the present embodiment, for example, smart media (solid-state floppy disk card) is applied as a device storing image data. The style of a recording medium is not limited to this application, but a PC card, a compact flash, a magnetic disk, an optical disk, a magneto-optic disk, a memory stick, etc. can be used. That is, an electronic, magnetic, or optical medium, or a combination of these media can be used as readable and writable media. The media are not limited to removable media, but storage media (internal memory) in the digital camera 10 can also be used.

When the power switch 22 sets a camera mode and the mode dial 50 selects a movie/audio recording mode, the CPU 70 automatically sets one of the movie mode and the audio recording mode according to a detection signal from an open/close sensor (not shown) of the lens barrier 11. That is, when the lens barrier 11 is in the open state, it is determined that a shooting process is intended, and the movie mode is selected. On the other hand, when the lens barrier 11 is in the close state, image cannot be captured, but audio can be recorded. Therefore, the audio recording mode is selected.

When the digital camera 10 is set in the movie mode, moving pictures with audio can be recorded. If the image recording operation starts by the press (S2=ON) of the release button 24, and the release button 24 is pressed again (S1=ON), then the image recording operation stops. Alternatively, the operation can be performed as follows: the image recording operation is performed while the release button 24 is continuously pressed, and then the image recording process is stopped by releasing the press. The moving picture data is recorded on the memory card 72 according to the motion JPEG system, for example.

When the digital camera 10 is set in the audio recording mode, audio can be recorded. The release button 24 is fully pressed (S2=ON) to start recording audio, and then the release button 24 is half pressed (S1=ON) to stop recording audio. Thus, the operation sound of the release button 24 is not recorded. The audio information inputted through the microphone 19 is received by an audio processing LSI 90. The audio processing LSI 90 converts an inputted audio signal into a digital signal in a predetermined file format (for example, a WAVE format). Thus, the obtained audio data is recorded on the memory card 72 through the media controller 84.

When the camera mode is set by the power switch 22 and the reproducing mode is selected by the mode dial 50, the file of the last frame recorded on the memory card 72 is read through the media controller 84. If the file of the last frame is a still image file, the compressed data of the read image file is decompressed to the YC signal of uncompressed data.

The decompressed YC signal is converted into a display signal through the LCD controller 86, and is outputted to the liquid crystal monitor 64. Thus, the frame image of the last frame recorded on the memory card 72 is displayed on the liquid crystal monitor 64.

Then, if the right key of the cross button 52 is pressed, frames are sequentially forwarded. If the left key is pressed, frames are sequentially reversed. Thus, the image file in the designated frame position is read from the memory card 72, and the frame image is reproduced on the liquid crystal monitor 64 as described above. If the frame is forwarded with the frame image of the last frame being displayed, then the image file of the first frame recorded on the memory card 72 is read, and the frame image of the first frame is reproduced on the liquid crystal monitor 64.

If a file to be reproduced is an audio file (audio file recorded in the audio recording mode), then the audio file is read from the memory card 72 when an audio reproduction start command is inputted. The read audio file is converted into an audio signal by the audio processing LSI 90, and the audio signal is outputted as audio through the speaker 28 or the head phone (ear phone) 35 connected to the remote control terminal 31.

The audio reproducing function of the digital camera 10 is of reproducing a music file in the MP3 (MPEG-1 audio layer-III) format, etc. recorded on the memory card 72. It is assumed that the music file is downloaded on the memory card 72 directly from a personal computer, a music distribution terminal, etc. or through the USB terminal 32 and a USB controller 85.

If the audio reproducing mode is set by the power switch 22, and the remote controller 36 with the head phone (ear phone) 35 is connected to the remote control terminal 31, then the power in the digital camera 10 is turned ON, thereby enabling the audio reproducing function. When the reproduction/stop button 37 of the remote controller 36 is pressed with the digital camera 10 set in the audio reproducing mode, then the music file is read from the memory card 72 through the media controller 84.

The compressed data of the music file read from the memory card 72 is decompressed into uncompressed music data in the audio processing LSI 90, then converted into an audio signal, and finally outputted as audio through the head phone 35 connected to the remote control terminal 31.

The digital camera 10 has the USB controller 85 and the USB terminal 32 as the devices which communicate data with the personal computer (PC) and other external equipment. By connecting the digital camera 10 to the personal computer, etc. using the USB cable (not shown), data can be transmitted and received between them.

The power supply circuit 66 contains a DC/DC converter, converts the power supply voltage supplied by the battery 65 into a desired voltage, and supplies the voltage to each circuit block. In the embodiment, the power supply circuit 66 generates voltages of 5V, 16V, −8V, 12V, and 3.3V/2.7V, supplies 5V to a lens drive system, supplies 16V and −8V to the CCD 74, and supplies 12V to the back light of the liquid crystal monitor 64. These voltages are operating voltages peculiar to the respective circuit blocks.

On the other hand, the power supply circuit 66 outputs one of 3.3V and 2.7V to a circuit block other than those described above according to a command inputted from the CPU 70. That is, when the operation mode of the digital camera 10 is set in the audio recording mode or the audio reproducing mode, the CPU 70 outputs the voltage of 2.7V to the circuit block operating when audio is recorded and reproduced in the audio processing LSI 90, etc. If the digital camera 10 is set in an operation mode other than the audio recording/reproducing mode, then the voltage of 3.3V is outputted to the circuit block operating when an image is recorded and reproduced in the image processing LSI 80, etc.

Furthermore, a battery check circuit 92 monitors whether or not an output voltage E of the battery 65 has become equal to or smaller than a predetermined threshold $E_1$ as a battery operation termination voltage, or whether or not it has become equal to or smaller than a threshold $E_2$ which is smaller than the threshold $E_1$, and outputs the monitor result to the CPU 70. The CPU 70 switches the threshold from $E_1$ to E2 if the operation mode of the digital camera 10 is set in the audio recording mode or the audio reproducing mode.

Figure 5:
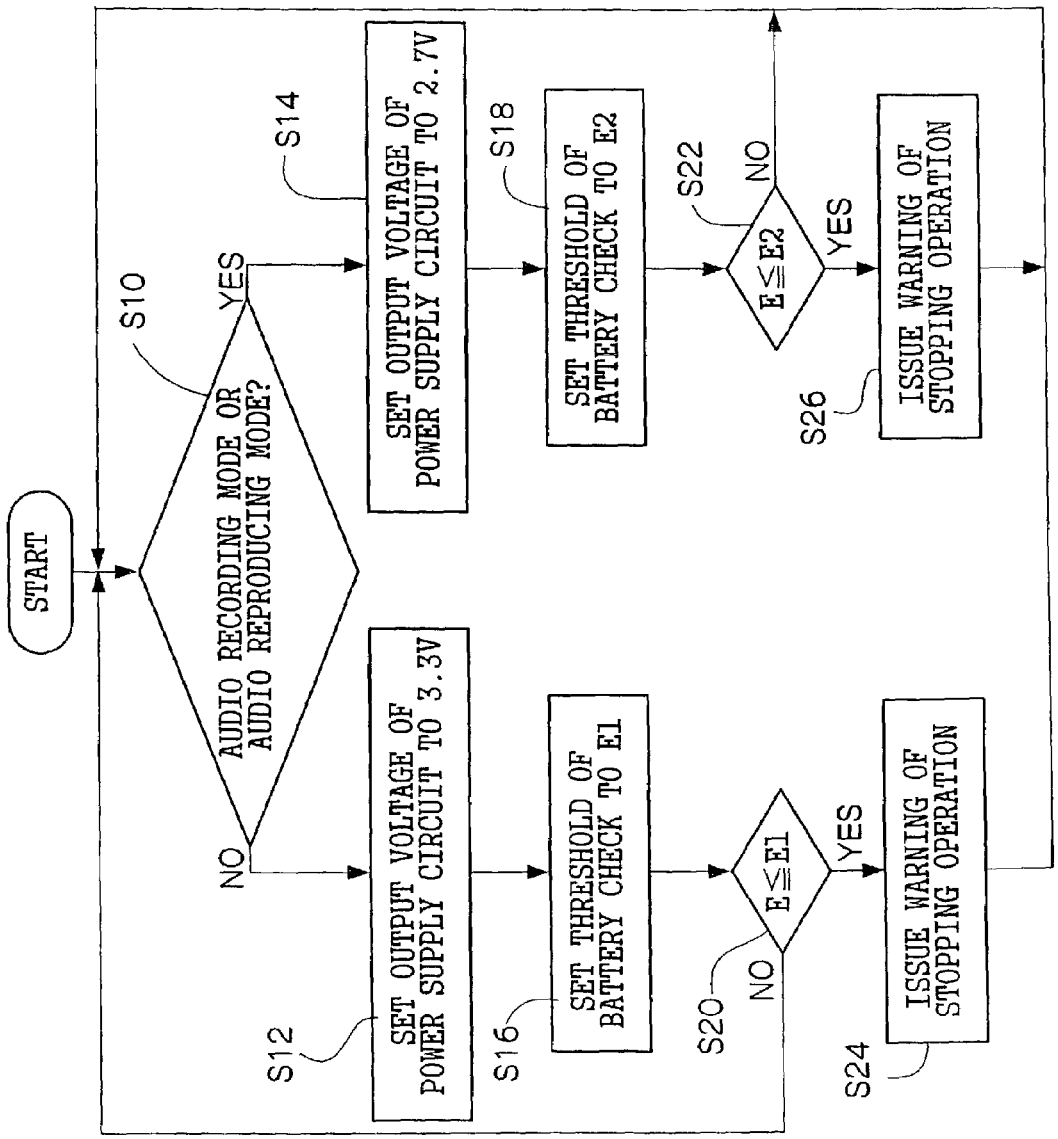
FIG. 5 is a flowchart of operations of switching an output voltage and switching a threshold when a battery check is performed on the camera according to an embodiment of the present invention.

The switching operation of the voltage of 3.3V or 2.7V or the switching operation of the threshold E1 or E2 at the time of checking the battery will be described below by referring to the flowchart shown in FIG. 5.

First, the CPU 70 determines whether or not the operation mode of the digital camera 10 is set in the audio recording mode or the audio reproducing mode (step S10). If an operation mode other than the audio recording/reproducing mode (that is, a shooting mode for shooting a still image, a reproducing mode for reproducing a taken image, a movie mode for taking moving pictures with audio, and a mode for USB communications) is set, then control is passed to step S12. If the audio recording mode or the audio reproducing mode is set, then control is passed to step S14.

In step S12, the voltage outputted from the power supply circuit 66 to the image processing LSI 80, etc. is set to 3.3V. In step S14, the voltage outputted from the power supply circuit 66 to the audio processing LSI 90, etc. is set to 2.7V.

When audio is recorded and reproduced in the audio recording/reproducing mode, an image process by the image processing LSI 80 is not required, and the audio processing LSI 90 requiring only a process at a lower speed than the image processing LSI 80 can be operated at a lower voltage. Therefore, in the audio recording mode or the audio reproducing mode, an operating voltage can be lowered. When the operating voltage is lowered, current consumption is reduced, thereby the power consumption obtained as a product of the voltage and the current can be considerably reduced. Furthermore, by lowering the output voltage from the power supply circuit 66, the entire current consumption can be reduced using the same output current if the boosting operation can be omitted in the power supply circuit 66.

Furthermore, in an operation mode other than the audio recording mode or the audio reproducing mode, the battery operation termination voltage when the battery is checked is set to the threshold E1 (step S16). In the audio recording mode or the audio reproducing mode, the battery operation termination voltage when the battery is checked is set to the threshold E2 which is smaller than the threshold E1 (step S118). The thresholds are switched because when audio is recorded and reproduced, the power consumption is smaller than when an image is recorded and reproduced, and the fluctuation in power consumption is not likely to occur by charging the electric flash device, driving the lens, etc. Thus, when audio is recorded and reproduced, the battery can be fully used to enable a long-time operation.

In step S20, it is determined whether or not the output voltage E of the battery 65 has become equal to or smaller than the threshold E1. If $E \leq E1$, the image recording/reproducing operation is stopped, and a warning of a small amount of remaining power of the battery 65 is issued (step S24). Similarly, in step S22, it is determined whether or not the output voltage E of the battery 65 is equal to or smaller than E2. If $E \leq E2$, the audio recording/reproducing operation is stopped, and a warning of a small amount of remaining power of the battery 65 is issued (step S26).

If an operation mode is switched from the audio recording mode or the audio reproducing mode into a mode other than the audio recording mode or the audio reproducing mode, an operation can be stopped and a warning can be issued although no warning is issued in the audio recording mode or the audio reproducing mode. On the other hand, if an operation mode is switched into the audio recording mode or the audio reproducing mode although an operation is stopped and a warning is issued in an operation mode other than the audio recording mode or the audio reproducing mode, then the operation can be performed and the warning can be released.

In the present embodiment, the audio recording mode, the audio reproducing mode, and other operation modes switch the output voltage of the power supply circuit 66. However, the present invention is not limited to this application. That is, an operation mode requiring obviously small power consumption and indicating low fluctuation in power consumption, for example, an operation mode transmitting and receiving image data in communications can be operated with smaller power consumption than in an image recording process. Therefore, the present invention can be applied to this mode. Furthermore, it can be applied to an electric flash emission prohibition mode because the current consumption is small at peak.

As described above, according to the present invention, equipment having a plurality of modes of different power consumption can switch output voltages into the minimum voltage at which a selected operation mode can be operated. Therefore, the power consumption can be reduced. Furthermore, the operation mode of a low power consumption can extend the operating time by lowering the threshold when a battery is checked.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A digital camera comprising:
   a mode selection device which selects a desired operation mode from a plurality of operation modes, said plurality of operation modes include a shooting mode, an image reproducing mode, an audio recording mode and an audio reproducing mode;
   a recording device on which image data and audio data are recorded as a predetermined file format;
   an image sensor;
   a monitor;
   an image processing device for recording/reproducing an image, wherein when the mode selection device selects the shooting mode, the image processing device performs predetermined signal processes for image data outputted from the image sensor and compresses the image data in a predetermined file format, and the compressed image data is recorded on the recording device, and when the mode selection device selects the image reproducing mode, the image processing device decompresses the image file data recorded on the recording device to a decompressed signal, and the decompressed signal is outputted to the monitor;
   a microphone;
   a speaker;
   an audio processing device for recording/reproducing audio which is operated at a lower voltage than said image processing device, wherein when the mode selection device selects the audio recording mode, the audio processing device converts an audio signal inputted through the microphone into a digital signal in a predetermined file format, and the digital signal is recorded on the recording device as an audio file, and when the mode selection device selects the audio reproducing mode, the audio processing device converts the audio file recorded on the recording device into an audio signal, and the audio signal is outputted as audio through the speaker;

a power supply device which generates operating voltages peculiar to the image sensor and the monitor respectively and supplies the operating voltages to the image sensor and the monitor respectively, and which generates a first operating voltage and a second operating voltage which is lower than said first operating voltage; and a voltage control device which supplies the first operating voltage to the image processing device from the power supply device in case of the shooting mode or the image reproducing mode and supplies the second operating voltage to the audio processing device from the power supply device in case of the audio recording mode or the audio reproducing mode.

2. The digital camera according to claim 1, wherein the voltage control device lowers the second operating voltage to be supplied to the audio processing device from the power supply device when the mode selection device selects one of the audio recording mode and audio reproducing mode, the audio recording mode and audio reproducing mode having lower power consumption and a smaller fluctuation in power consumption than the shooting mode or the image reproducing mode.

3. The digital camera according to claim 1, wherein:

a circuit unit in the apparatus comprises a first circuit unit whose operation is guaranteed by the first operating voltage, and a second circuit unit whose operation is guaranteed by the second operating voltage lower than the first operating voltage, the second circuit unit always operating in the plurality of operation modes; and the voltage control device allows the first operating voltage to be supplied from the power supply device to the first circuit unit and the second circuit unit when the first circuit unit and the second circuit unit are operated by the operation mode selected by the mode selection device, and allows the second operating voltage to be supplied from the power supply device to the second circuit unit when only the second circuit unit is operated.

4. The digital camera of claim 1, wherein in the image reproducing mode an image is displayed on the monitor of the digital camera, the image having been captured while the digital camera was in the shooting mode.

5. A digital camera comprising:

a mode selection device which selects a desired operation mode from a plurality of operation modes, said plurality of operation modes include a shooting mode, an image reproducing mode, an audio recording mode and an audio reproducing mode;

an image sensor;

a monitor;

an image processing device for recording/reproducing an image, wherein when the mode selection device selects the shooting mode, the image processing device performs predetermined signal processes for image data outputted from the image sensor and compresses the image data in a predetermined file format, and the compressed image data is recorded on the recording device, and when the mode selection device selects the image reproducing mode, the image processing device decompresses the image file data recorded on the recording device to a decompressed signal, and the decompressed signal is outputted to the monitor;

a microphone;

a speaker;

an audio processing device for recording/reproducing audio which is operated at a lower voltage than said image processing device, wherein when the mode selection device selects the audio recording mode, the audio processing device converts an audio signal inputted through the microphone into a digital signal in a predetermined file format, and the digital signal is recorded on the recording device as an audio file, and when the mode selection device selects the audio reproducing mode, the audio processing device converts the audio file recorded on the recording device into an audio signal, and the audio signal is outputted as audio through the speaker;

a power supply device which generates operating voltages peculiar to the image sensor and the monitor respectively and supplies the operating voltages to the image sensor and the monitor respectively, and which generates a first operating voltage and a second operating voltage which is lower than said first operating voltage;

a battery which supplies power to the power supply device;

a battery check device which terminates a battery operation when an output voltage of the battery drops down to a predetermined threshold;

a voltage control device which supplies the first operating voltage to the image processing device from the power supply device in case of the shooting mode or the image reproducing mode and supplies the second operating voltage to the audio processing device from the power supply device in case of the audio recording mode or the audio reproducing mode; and a threshold control device which raises the threshold in case of the shooting mode or the image reproducing mode than the threshold in case of the audio recording mode or the audio reproducing mode.

6. The digital camera according to claim 5, wherein the voltage control device lowers the second operating voltage to be supplied to the audio processing device from the power supply device when the mode selection device selects one of the audio recording mode and audio reproducing mode, the audio recording mode and audio reproducing mode having lower power consumption and a smaller fluctuation in power consumption than shooting mode or the image reproducing mode.

7. The digital camera according to claim 5, wherein the threshold control device lowers the threshold in the battery check device when the mode selection device selects one of the plurality of the operation modes, the one of the plurality of operation modes having lower power consumption and a smaller fluctuation in power consumption than other of the plurality of the operation modes.

8. The digital camera according to claim 5, wherein:

a circuit unit in the apparatus comprises a first circuit unit whose operation is guaranteed by the first operating voltage, and a second circuit unit whose operation is guaranteed by the second operating voltage lower than the first operating voltage, the second circuit unit always operating in the plurality of operation modes; and the voltage control device allows the first operating voltage to be supplied from the power supply device to the first circuit unit and the second circuit unit when the first circuit unit and the second circuit unit are operated by the operation mode selected by the mode selection device, and allows the second operating voltage to be supplied from the power supply device to the second circuit unit when only the second circuit unit is operated.

* * * * *